US010411231B2

(12) United States Patent
Nishimura et al.

(10) Patent No.: US 10,411,231 B2
(45) Date of Patent: Sep. 10, 2019

(54) ENERGY STORAGE APPARATUS

(71) Applicants: GS Yuasa International Ltd., Kyoto-shi (JP); Honda Motor Co., Ltd., Tokyo (JP)

(72) Inventors: Yosuke Nishimura, Kyoto (JP); Hiroaki Kakimura, Kyoto (JP)

(73) Assignees: GS YUASA INTERNATIONAL LTD., Kyoto-Shi, Kyoto (JP); HONDA MOTOR CO., LTD., Minato-Ku, Tokyo (JP)

( * ) Notice: Subject to any disclaimer, the term of this patent is extended or adjusted under 35 U.S.C. 154(b) by 115 days.

(21) Appl. No.: 15/436,392

(22) Filed: Feb. 17, 2017

(65) Prior Publication Data

US 2017/0244079 A1    Aug. 24, 2017

(30) Foreign Application Priority Data

Feb. 19, 2016   (JP) .................................. 2016-030362

(51) Int. Cl.
   *H01M 2/10*         (2006.01)
   *H01G 11/10*        (2013.01)
   (Continued)

(52) U.S. Cl.
   CPC .......... *H01M 2/1094* (2013.01); *H01G 11/10* (2013.01); *H01G 11/76* (2013.01);
   (Continued)

(58) Field of Classification Search
   None
   See application file for complete search history.

(56) References Cited

U.S. PATENT DOCUMENTS

| 2015/0132634 A1* | 5/2015 | Sera ..................... H01M 10/625 |
| | | 429/153 |
| 2015/0140408 A1 | 5/2015 | Hayashida et al. |
| 2015/0147613 A1 | 5/2015 | Hayashida et al. |

FOREIGN PATENT DOCUMENTS

| JP | 2012-164684 A | 8/2012 |
| JP | 2015-099649 A | 5/2015 |

(Continued)

*Primary Examiner* — Daniel S Gatewood
(74) *Attorney, Agent, or Firm* — McGinn I.P. Law Group, PLLC.

(57) ABSTRACT

An energy storage apparatus includes an energy storage device containing a case where a corner portion is formed by a first wall portion and a second wall portion, an opposedly facing member which opposedly faces the first wall portion, and an insulator covering at least a region of the opposedly facing member which opposedly faces the energy storage device. The opposedly facing member contains a body disposed along the first wall portion and an extension portion extending from the body along the second wall portion. The insulator contains a cover portion which extends to a distal end of the extension portion from a boundary position between the extension portion and the body along an opposedly facing surface of the extension portion which opposedly faces the second wall portion, is folded back at the distal end, and extends along an outer surface of the extension portion opposite to the second wall portion. A first inner surface of the cover portion which opposedly faces the opposedly facing surface of the extension portion includes a projecting portion which projects toward the opposedly facing surface.

18 Claims, 8 Drawing Sheets

(51) Int. Cl.
*H01G 11/76* (2013.01)
*H01G 11/82* (2013.01)

(52) U.S. Cl.
CPC .......... *H01G 11/82* (2013.01); *H01M 2/1016* (2013.01); *Y02E 60/13* (2013.01)

(56) References Cited

FOREIGN PATENT DOCUMENTS

| | | | |
|---|---|---|---|
| JP | 2015099649 A | * | 5/2015 |
| WO | WO 2013/179796 A1 | | 12/2013 |
| WO | WO 2013/179797 A1 | | 12/2013 |
| WO | WO 2013/179798 A1 | | 12/2013 |

* cited by examiner

FIG. 3
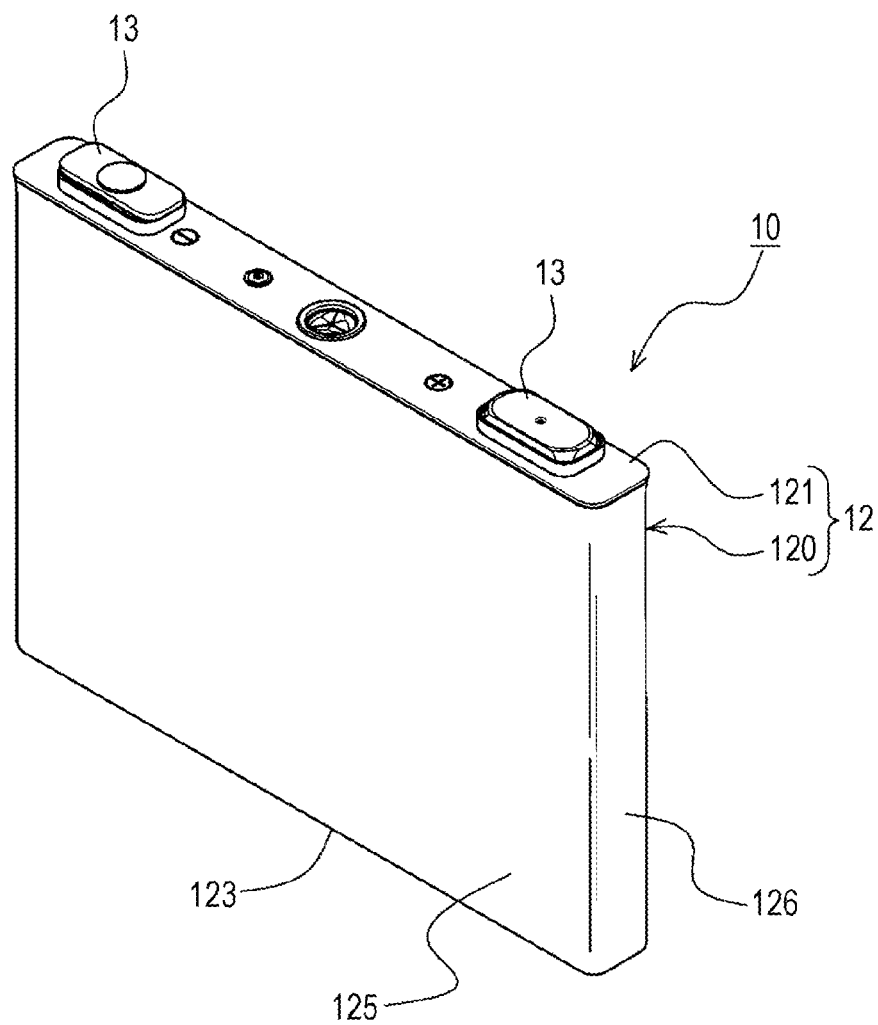
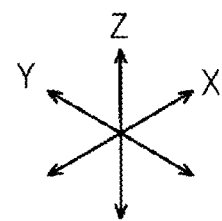

FIG. 7
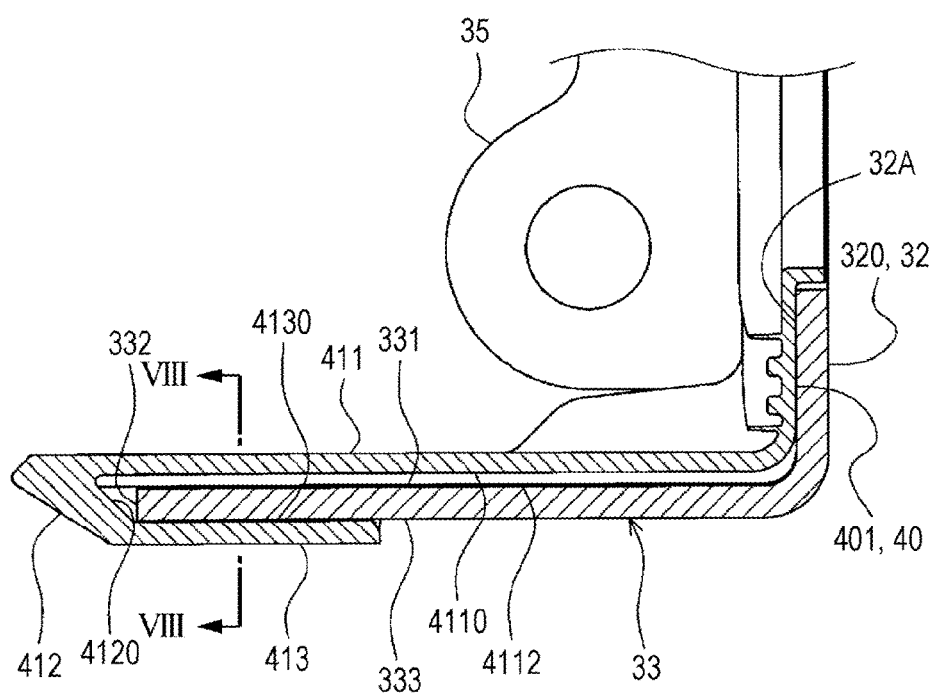
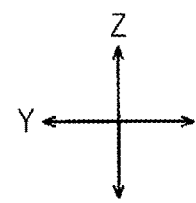

ENERGY STORAGE APPARATUS

CROSS-REFERENCE TO RELATED APPLICATIONS

This application is based on Japanese Patent Application No. 2016-030362 filed on Feb. 19, 2016, the entire contents of which is hereby incorporated by reference.

FIELD

The present invention relates to an energy storage apparatus which includes insulators disposed between energy storage devices and members which hold the energy storage devices.

BACKGROUND

Conventionally, there has been known an energy storage module which includes: energy storage cells; a pair of side-portion fastening frames which sandwiches the energy storage cells therebetween in a width direction; and insulators which are disposed between the energy storage cells and side-portion fastening frames (see JP-A-2015-99649).

To be more specific, the energy storage module is assembled such that the plurality of energy storage cells and the end plates are stacked in a stacking direction and, in such a state, both end portions of the pair of side-portion fastening frames made of a metal plate-like member in a stacking direction are fastened to both end portions of the pair of end plates in a width direction. Further, in the energy storage module, the plurality of energy storage cells are sandwiched by the pair of insulators from both sides in a width direction, and the plurality of energy storage cells are sandwiched and fixed by the pair of side-portion fastening frames from the outside in the width direction.

In this manner, the energy storage module has the simple structure where the insulators are simply sandwiched between the plurality of the energy storage cells and the side-portion fastening frames. Accordingly, during the use of the energy storage module, there is a case where rain water or the like (water) is adhered to a surface of the side-portion fastening frame which opposedly faces the energy storage cells or a condensate or the like (water) is generated on the opposedly facing surface. In such a case, there is a possibility that water leaks out from between the insulator and the side-portion fastening frame and flows toward an energy storage battery cell side so that electric resistance between the energy storage cells or electric resistance between the energy storage cell and the side-portion fastening frame becomes small due to such water.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus where electric resistance between an energy storage device and an opposedly facing member hardly becomes small even when water is adhered to or generated on a surface of the opposedly facing member which opposedly faces the energy storage device.

An energy storage apparatus according to an aspect of the present invention includes an energy storage device containing a case where a corner portion is formed by a first wall portion and a second wall portion, an opposedly facing member which opposedly faces the first wall portion, and an insulator covering at least a region of the opposedly facing member which opposedly faces the energy storage device. The opposedly facing member contains a body disposed along the first wall portion and an extension portion extending from the body along the second wall portion. The insulator contains a cover portion which extends to a distal end of the extension portion from a boundary position between the extension portion and the body along an opposedly facing surface of the extension portion which opposedly faces the second wall portion, is folded back at the distal end, and extends along an outer surface of the extension portion opposite to the second wall portion. A first inner surface of the cover portion which opposedly faces the opposedly facing surface of the extension portion includes a projecting portion which projects toward the opposedly facing surface.

BRIEF DESCRIPTION OF DRAWINGS

The foregoing and other features of the present invention will become apparent from the following description and drawings of an illustrative embodiment of the invention in which:

FIG. 3 is a perspective view of an energy storage device used in the energy storage apparatus.

FIG. 7 is a cross-sectional view of a first extension portion of the opposedly facing member taken along a line VII-VII in FIG. 6 in a state where the first extension portion is covered by a first cover portion of the insulator.

DESCRIPTION OF EMBODIMENTS

Figure 1:
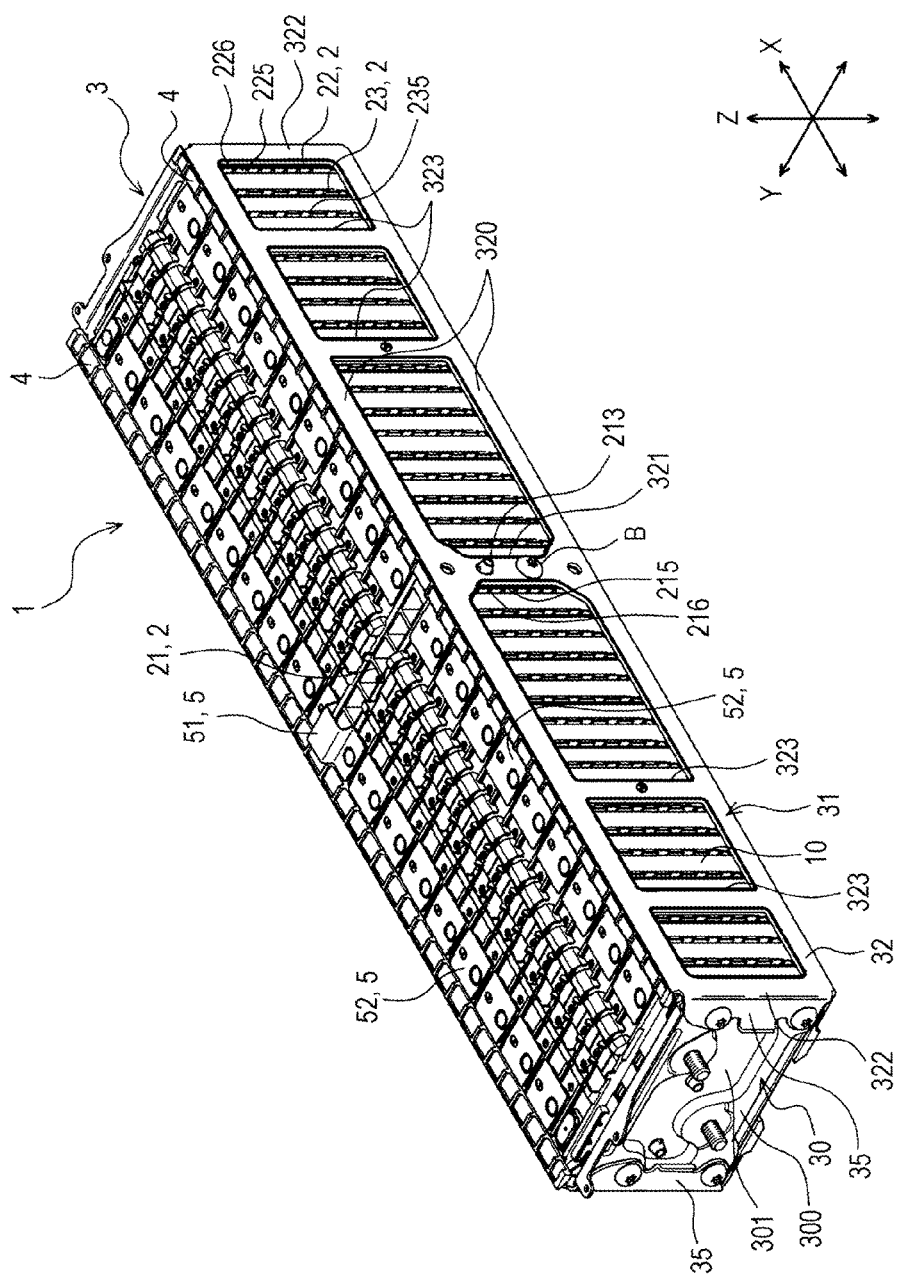
FIG. 1 is a perspective view of an energy storage apparatus according to an embodiment of the present invention.

According to an aspect of the present invention, there is provided an energy storage apparatus including an energy storage device containing a case where a corner portion is formed by a first wall portion and a second wall portion, an opposedly facing member which opposedly faces the first wall portion, and an insulator covering at least a region of the opposedly facing member which opposedly faces the energy storage device. The opposedly facing member contains a body disposed along the first wall portion and an extension portion extending from the body along the second wall portion. The insulator contains a cover portion which extends to a distal end of the extension portion from a boundary position between the extension portion and the body along an opposedly facing surface of the extension portion which opposedly faces the second wall portion, is folded back at the distal end, and extends along an outer surface of the extension portion opposite to the second wall portion. A first inner surface of the cover portion which opposedly faces the opposedly facing surface of the extension portion includes a projecting portion which projects toward the opposedly facing surface.

With such a configuration, water which is adhered to or generated on the opposedly facing surface of the body which opposedly faces the energy storage device or the like is easily pulled into a space formed between the first inner surface and the extension portion due to a surface tension or the like as the projecting portion is brought into contact with the extension portion. Further, the cover portion is folded back at the distal end of the extension portion and hence, even when water which is sucked into the space formed between the first inner surface and the extension portion leaks, water leaks out to an outer surface of the extension portion and there is a least possibility that water advances toward an energy storage device. As a result, in the energy storage apparatus, there is a least possibility that electric resistance between the energy storage devices and the opposedly facing member becomes small due to water adhered to or generated on the opposedly facing surface of the body of the opposedly facing member with the energy storage devices.

In the energy storage devices, the projecting portion may extend in a direction toward the distal end from the boundary position.

With such a configuration, in the direction toward the distal end from the boundary position (that is, in the direction that the extension portion extends), a space formed between the first inner surface and the extension portion becomes large by the projecting portion and hence, an amount of water which can be stored between the first inner surface and the extension portion can be increased. Accordingly, an amount of water adhered to or generated on an opposedly facing surface of the body with the energy storage devices which can be sucked into the space is increased, and there is a least possibility that water leaks out from between the first inner surface and the extension portion. As a result, there is a least possibility that electrical resistance between the energy storage devices and the opposedly facing member becomes small due to water adhered to or generated on the opposedly facing surface of the body of the opposedly facing member with the energy storage devices.

In this case, the energy storage apparatus may include a plurality of energy storage devices, the energy storage devices are disposed in a state where the first wall portions and the second wall portions are directed in the same directions respectively, and the first inner surface may include the plurality of projecting portions arranged at intervals in a direction that the plurality of energy storage devices are arranged in a row.

With such a configuration, the plurality of projecting portions extending in the direction toward a distal end from a boundary position of the extension portion are disposed at intervals in the direction that the energy storage devices are disposed. Accordingly, spreading or movement of water sucked into the space between the first inner surface and the extension portion in the direction that energy storage devices are arranged in parallel to each other can be suppressed. That is, the space between the first inner surface and the extension portion is divided into a plurality of regions by the plurality of projecting portions and hence, water sucked into a certain region (a certain space between the projecting portions) of the space is minimally movable to other regions (other space between the projecting portions). Accordingly, when the energy storage apparatus is inclined or tilted, it is possible to suppress collection of water which exists between the first inner surface and the extension portion to one place.

In this case, a distance between the projecting portions disposed adjacently to each other in the direction that the plurality of energy storage devices are arranged in the row may be smaller than a distance between the energy storage devices disposed adjacently to each other in the direction that the plurality of energy storage devices are arranged in the row.

With such a configuration, because a size of each divided space between the first inner surface and the extension portion becomes smaller than the distance between the energy storage devices so that it is possible to suppress expanding of water which is sucked into the space exceeding the distance between the energy storage devices in the direction that the plurality of energy storage devices are arranged in the row.

In the energy storage apparatus, the projecting portion may extend to a position corresponding to the boundary position from a position corresponding to the distal end of the extension portion.

With such a configuration, the projecting portion extends to a position corresponding to the boundary position and hence, the space formed between the first inner surface and the extension portion by the projecting portion is brought into a state where the space opens at the boundary portion. Accordingly, water in the vicinity of the boundary position on an opposedly facing surface of the body of the opposedly facing member with the energy storage device is easily sucked into the space formed between the first inner surface and the extension portion.

In the energy storage apparatus, a second inner surface of the cover portion which covers the distal end of the extension portion may be disposed with a distance between the second inner surface and the distal end.

With such a configuration, water sucked into the space between the first inner surface and the extension portion can be stored in the space between the second inner surface and the distal end of the extension portion which is disposed at a position remote from the body. Accordingly, it is possible to prevent with further certainty that water sucked into the space between the first inner surface and the extension portion leaks out from the body side.

In this case, the second inner surface may include a surface which approaches the distal end of the extension portion as the second inner surface advances in a direction toward the outer surface from the opposedly facing surface of the extension portion.

With such a configuration, when the energy storage apparatus is disposed such that the opposedly facing surface of the extension portion is directed upward, the surface which the second inner surface includes (a surface which approaches the distal end of the extension portion as the surface advances in a direction toward the outer surface from the opposedly facing surface of the extension portion) becomes an inclined surface directed downward as the inclined surface approaches the distal end of the extension portion. Therefore, water stored between the second inner surface and the distal end of the extension portion is easily moved toward the outer surface of the extension portion. That is, the stored water minimally moves toward the opposedly facing surface of the extension portion. Accordingly, it is possible to effectively suppress the leakage of the stored water from the body of the opposedly facing member through the space formed between the first inner surface and the extension portion.

In the energy storage apparatus, a third inner surface of the cover portion which opposedly faces the outer surface of the extension portion may have a size smaller than a size of the extension portion in the direction toward the distal end from the boundary position.

With such a configuration, the third inner surface is shorter than the extension portion in the direction directed toward the distal end from the boundary position and hence, water sucked into the space between the first inner surface and the extension portion is easily discharged from the outer surface (a side remote from the energy storage device) of the extension portion compared to from the opposedly facing surface (a side close to the energy storage device) of the extension portion which is wholly covered by the cover portion. Accordingly, water sucked into the space formed between the first inner surface and the extension portion is discharged from a side remote from the energy storage device and hence, it is possible to suppress the leakage of water from a side close to the energy storage device with further certainty. As a result, it is possible to more effectively suppress the occurrence of a phenomenon that electric resistance between the energy storage device and the opposedly facing member is decreased due to water which adheres to or is generated on the opposedly facing surface of the body of the opposedly facing member with the energy storage device.

As has been described heretofore, according to this embodiment, it is possible to provide an energy storage apparatus where electric resistance between an energy storage device and an opposedly facing member hardly becomes small even when water is adhered to or is formed on a surface of an opposedly facing member which opposedly faces an energy storage device.

Hereinafter, one embodiment of the present invention is described with reference to FIG. 1 to FIG. 9. Names of respective constitutional members (respective constitutional elements) of this embodiment are used only for this embodiment, and may differ from names of respective constitutional members (respective constitutional elements) used in BACKGROUND.

Figure 2:
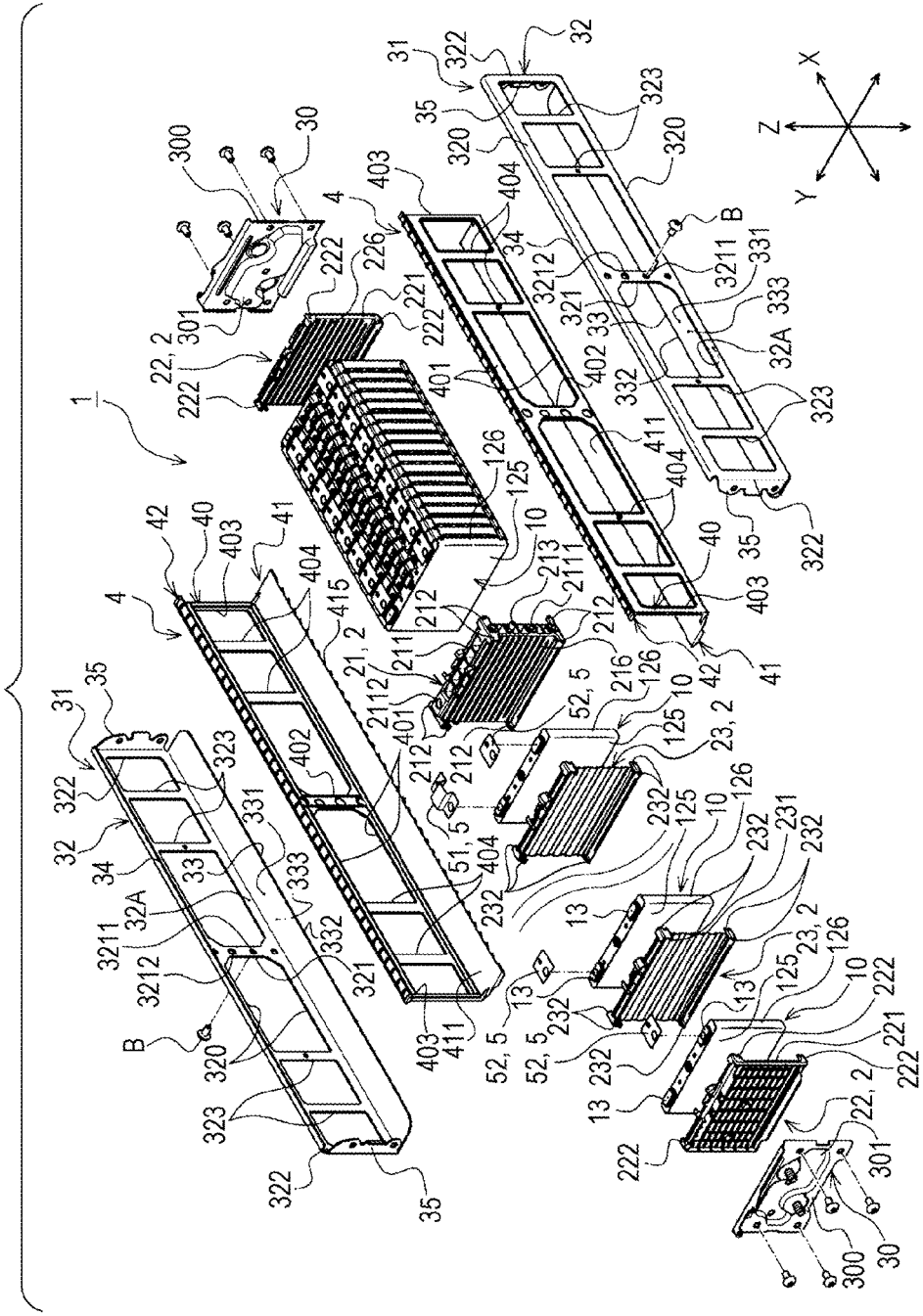
FIG. 2 is an exploded perspective view of the energy storage apparatus with a part omitted.

As shown in FIG. 1 and FIG. 2, an energy storage apparatus includes: a plurality of energy storage devices 10 which are arranged in a row in a predetermined direction and each of which has external terminals 13; and a plurality of bus bars 5 each of which is connected to the external terminals 13 of the adjacent energy storage devices 10. The energy storage apparatus 1 also includes: a plurality of adjacent members 2 each of which is disposed adjacently to the energy storage device 10; a holder 3 which collectively holds the plurality of energy storage devices 10 and the plurality of adjacent members 2; and insulators 4 which are disposed between the plurality of energy storage devices 10 and the holder 3.

Figure 4:
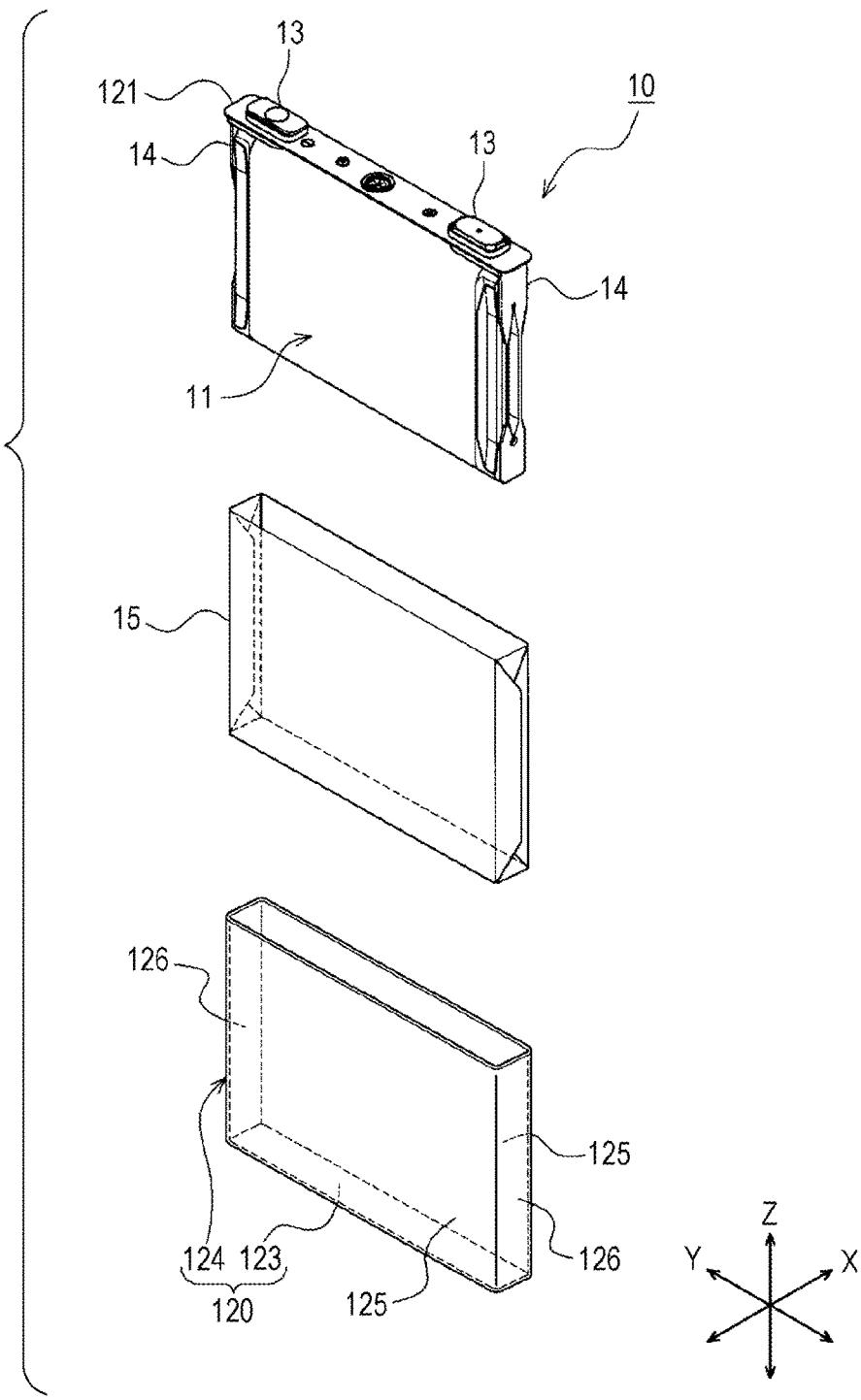
FIG. 4 is an exploded perspective view of the energy storage device.

As also shown in FIG. 3 and FIG. 4, each of the plurality of energy storage devices 10 includes: an electrode assembly 11 which includes a positive electrode and a negative electrode; a case 12 which houses the electrode assembly 11; and the pair of external terminals 13 disposed on an outer surface of the case 12. Further, the energy storage device 10 also includes current collectors 14 which make the electrode assembly 11 and the external terminals 13 conductive with each other, an insulation cover 15 which is disposed between the electrode assembly 11 and the case 12 and provides insulation between the electrode assembly 11 and the case 12, and the like.

The case 12 includes: a case body 120 having an opening; and a lid plate 121 which closes the opening of the case body 120.

The case body 120 includes: a rectangular-plate-like closed portion (second wall portion) 123; and a cylindrical tubular portion 124 which is connected to a periphery of the closed portion 123. In the description made hereinafter, a short-side direction of the closed portion 123 is assumed as an X axis direction in an orthogonal coordinate system, a long-side direction of the closed portion 123 is assumed as a Y axis direction in the orthogonal coordinate system, and a normal direction of the closed portion 123 is assumed as a Z axis direction in the orthogonal coordinate system. In accordance with such an orthogonal coordinate system, orthogonal coordinate axes which respectively correspond to the X axis direction, the Y axis direction, and the Z axis direction are described auxiliarily in the respective drawings.

The tubular portion 124 has a prismatic cylindrical shape along a profile of the closed portion 123, that is, a flat prismatic cylindrical shape. To be more specific, the tubular portion 124 includes: a pair of long wall portions 125 which extends from long sides of the periphery of the closed portion 123; and a pair of short wall portions (first wall portions) 126 which extends from the short sides of the periphery of the closed portion 123. That is, the pair of long wall portions 125 opposedly faces each other in a spaced-apart manner in the X axis with a distance (to be more specific, a distance which corresponds to the short side of the periphery of the closed portion 123) therebetween, and the pair of short wall portions 126 opposedly faces each other in a spaced-apart manner in the X axis with a distance (to be more specific, a distance which corresponds to the long side on the periphery of the closed portion 123) therebetween. The short wall portions 126 respectively connect corresponding end portions of the pair of long wall portions 125 (to be more specific, end portions which opposedly face each other in the X axis direction) to each other so that the prismatic cylindrical tubular portion 124 is formed. One end of the tubular portion 124 is closed by the closed portion 123, and the other end of the tubular portion 124 is opened. That is, the case body 120 has a bottomed flat prismatic cylindrical shape.

The lid plate 121 is a plate-like member which closes the opening of the case body 120. To be more specific, the lid plate 121 has a profile which corresponds to a peripheral edge portion of the opening of the case body 120 as viewed in the normal direction. In this embodiment, the pair of external terminals 13 is mounted on the lid plate 121 in a state where the pair of external terminals 13 is electrically connected to respective electrodes (the positive electrode, the negative electrode) of the electrode assembly 11 via the current collectors 14 respectively. In this embodiment, on the lid plate 121, the pair of external terminals 13 is disposed in a spaced-apart manner in a longitudinal direction of the lid plate 121 having a rectangular shape.

The case 12 having the above-mentioned configuration is formed such that the opening of the case body 120 is closed by making a peripheral edge portion of the lid plate 121 overlap with the peripheral edge portion of the opening of the case body 120 in a state where the electrode assembly 11 is housed in the inside of the case 12, and a boundary portion between the lid plate 121 and the case body 120 is welded to each other in such a state. In this embodiment, the case 12 has a rectangular parallelepiped shape. That is, the short wall portions 126 and the closed portion 123 form two corner portions (lower corner portions in FIG. 3) of the case 12 as viewed in the X axis direction, and the short wall portions 126 and the lid plate 121 form another two corner portions (upper corner portions in FIG. 3) of the case 12 as viewed in the X axis direction.

In the energy storage apparatus 1 of this embodiment, the plurality of energy storage devices 10 each of which has the above-mentioned configuration are disposed. To be more specific, the plurality of energy storage devices 10 are arranged in a row such that wide wall portions (long wall portions 125) of the tubular portions 124 of the respective energy storage devices 10 opposedly face each other. With such a configuration, the short wall portions 126 of the respective energy storage devices 10 are directed in the Y axis direction, and the closed portions 123 (or the lid plates 121) of the respective energy storage devices 10 are directed in the Z axis direction.

Each adjacent member 2 is disposed between two energy storage devices 10 disposed adjacently to each other in the X axis direction or between the energy storage device 10 and a member which is disposed adjacently to the energy storage device 10 in the X axis direction (in this exemplified embodiment, a portion of the holder 3). As shown in FIG. 1 and FIG. 2, the adjacent members 2 include plural types of adjacent members. In this embodiment, the adjacent members 2 have: a first adjacent member (adjacent member) 21 which is disposed adjacently to the energy storage devices 10 disposed at an intermediate position in the X axis direction of the energy storage apparatus 1; second adjacent members 22 which are disposed adjacently to the outermost energy storage devices 10 out of the plurality of energy storage devices 10 arranged in a row in the X axis direction respectively; and third adjacent members 23 each of which is disposed adjacently to the energy storage devices 10 disposed between the first adjacent member 21 and the second adjacent members 22.

The first adjacent member 21 is disposed between the energy storage devices 10 which are disposed adjacently to each other in the X axis direction. With such a configuration, a predetermined distance (a creepage distance or the like) is ensured between the energy storage devices 10 which are disposed adjacently to each other in the X axis direction with the first adjacent member 21 interposed therebetween. The first adjacent member 21 is connected (fixed) to the holder 3.

To be more specific, the first adjacent member 21 has: a body portion (hereinafter referred to as "first body portion") 211 which is disposed adjacently to the energy storage device 10 (case body 120); and restricting portions (hereinafter referred to as "first restricting portions") 212 which restrict the movement of the energy storage devices 10 disposed adjacently to the first body portion 211 with respect to the first body portion 211. Further, the first adjacent member 21 has shaft portions 213 which engage with the holder 3.

The first body portion 211 has a rectangular profile which corresponds to the energy storage device 10 (case 12) disposed adjacently to the first body portion 211 as viewed in the X axis direction, and has connecting portions 2111 for fixing (connecting) the first body portion 211 to the holder 3. Flow channels 215 which allow a temperature adjusting fluid (air in an example of this embodiment) to pass therethrough are formed between the first body portion 211 and the energy storage devices 10 disposed adjacently to the first body portion 211 in the X axis direction. To be more specific, on the first body portion 211, a plurality of projecting portions 216 each of which projects toward the adjacent energy storage device 10 (in the X axis direction) and extends in the Y axis direction are arranged at intervals in the Z axis direction. Distal ends (distal ends in the projecting direction) of the plurality of projecting portions 216 are brought into contact with the energy storage devices 10 disposed adjacently to the first body portion 211 respectively thus forming the flow channels 215 between the first adjacent member 21 and the energy storage devices 10. Further, with respect to the first adjacent member 21 in this embodiment, a size in the X axis direction of the first body portion 211 is larger than sizes in the X axis direction of portions of the second adjacent member 22 and the third adjacent member 23 which correspond to the first body portion 211.

The first body portion 211 has a projecting portion 2112. The projecting portion 2112 is formed on an end portion on one side of the first body portion 211 in the Z axis direction (in this exemplified embodiment, on a side of the energy storage device 10 which corresponds to the lid plate 121). The projecting portion 2112 is a portion which is formed by partially projecting one-side end surface of the first body portion 211. In this embodiment, the projecting portion 2112 is a portion having a rectangular parallelepiped shape which is disposed at a position where the projecting portion 2112 overlaps, in the Z axis direction, with the bus bar 5 which makes the external terminals 13 of the energy storage devices 10 disposed on both sides of the first adjacent member 21 conductive with each other.

The connecting portions 2111 are formed on end portions of the first body portion 211 in the Y axis direction respectively. In this embodiment, the connecting portions 2111 are formed on both end portions of the first body portion 211 in the Y axis direction respectively. The connecting portion 2111 is a portion with which a bolt B is threadedly engaged in a state where the bolt B penetrates the holder 3. In the energy storage apparatus 1, due to threaded engagement of the bolts B with the corresponding connecting portions 2111, the first body portion 211 (first adjacent member 21) and the holder 3 are connected to each other. In this embodiment, the connecting portions 2111 are nuts which are embedded into the end portions of the first body portion 211 in the Y axis direction.

The first restricting portions 212 extend in the X axis direction from the first body portion 211 and are brought into contact with the energy storage device 10 (to be more specific, the case 12) disposed adjacently to the first body portion 211 from the outside in the Y-Z plane (a plane including the Y axis and the Z axis) direction thus restricting the relative movement of the energy storage device 10 in the Y-Z plane direction with respect to the first body portion 211. The first restricting portions 212 extend in the X axis direction from at least respective corner portions of the first body portion 211 thus are brought into contact with corner portions of the energy storage device 10 (case 12) disposed adjacently to the first body portion 211 from the outside in the Y-Z plane.

The shaft portions 213 extend outward from ends of the first body portion 211 in the Y axis direction, and engage with the holder 3. In this embodiment, the shaft portions 213 extend outward from both ends of the first body portion 211 in the Y axis direction respectively. To be more specific, the shaft portions 213 extend in a circular columnar shape in the Y axis direction from the end portions of the first body portion 211 in the Y axis direction at an intermediate position in the Z axis direction, and are made to pass through the through holes 3212 which are formed in the holder 3 at positions corresponding to the shaft portions 213. In this embodiment, the shaft portions 213 are used for positioning the first adjacent member 21 with respect to the holder 3 at the time of connecting (fixing) the first adjacent member 21 to the holder 3 in the manufacture of the energy storage apparatus 1.

The second adjacent member 22 is disposed between the energy storage device 10 and the holder 3 in the X-axis direction. With such a configuration, a predetermined distance (a creepage distance or the like) is ensured between the energy storage device 10 and the holder 3 which are disposed in the X-axis direction adjacently to each other with the second adjacent member 22 interposed therebetween.

To be more specific, the second adjacent member 22 has: a body portion (hereinafter referred to as "second body portion") 221 disposed adjacently to the energy storage device 10 (case body 120) and between the energy storage device 10 and the holder 3; and restricting portions (hereinafter referred to as "second restricting portions") 222 which restrict the movement of the energy storage device 10 disposed adjacently to the second body portion 221 with respect to the second body portion 221.

The second body portion 221 has a rectangular profile corresponding to the energy storage device 10 (case 12) disposed adjacently to the second body portion 221 as viewed in the X axis direction. Further, flow channels 225 which allow a temperature control fluid (air in this exemplified embodiment) to pass therethrough are formed between the second body portion 221 and the energy storage device 10 disposed adjacently to the second body portion 221 in the X axis direction. To be more specific, on the second body portion 221, a plurality of projecting portions 226 each of which projects toward the adjacent energy storage devices 10 (in the X axis direction) and extends in the Y axis direction are arranged in a row at intervals in the Z axis direction. With such a configuration, distal ends (distal ends in the projecting direction) of the projecting portions 226 are brought into contact with the energy storage device 10 disposed adjacently to the second body portion 221 thus forming the flow channels 225 between the second adjacent member 22 and the energy storage device 10.

The second restricting portions 222 extend in the X axis direction from the second body portion 221, and are brought into contact with the energy storage device 10 disposed adjacently to the second body portion 221 (to be more specific, the case 12) from the outside in the Y-Z plane direction thus restricting the relative movement of the energy storage device 10 in the Y-Z plane direction with respect to the second body portion 221. The second restricting portions 222 extend in the X axis direction from at least respective corner portions of the second body portion 221 thus are brought into contact with corner portions of the energy storage device 10 (case 12) disposed adjacently to the second body portion 221 from the outside in the Y-Z plane direction.

Between the first adjacent member 21 and the second adjacent member 22, the third adjacent member 23 is disposed between each two of the energy storage devices 10 disposed adjacently to each other in the X axis direction. With such a configuration, a predetermined distance (a creepage distance or the like) is ensured between the energy storage devices 10 which are disposed adjacently to each other in the X axis direction with the third adjacent member 23 interposed therebetween.

To be more specific, the third adjacent member 23 has: a body portion (hereinafter referred to as "third body portion") 231 which is disposed adjacently to the energy storage device 10 (case body 120); and restricting portions (hereinafter referred to as "third restricting portions") 232 which restrict the movement of the energy storage devices 10 disposed adjacently to the third body portion 231 with respect to the third body portion 231.

The third body portion 231 has a rectangular profile which corresponds to the energy storage device 10 (case 12) disposed adjacently to the third body portion 231 as viewed in the X axis direction. Further, flow channels 235 which allow a temperature control fluid (air in this exemplified embodiment) to pass therethrough are formed between the third body portion 231 and the energy storage devices 10 disposed adjacently to the third body portion 231 in the X axis direction. To be more specific, the third body portion 231 has a rectangular corrugated cross sectional shape. With such a configuration, the third body portion 231 is brought into contact with the energy storage devices 10 disposed adjacently to the third body portion 231 thus forming the flow channels 235 between the third body portion 231 and the energy storage devices 10.

The third restricting portions 232 extend in the X axis direction from the third body portion 231 and are brought into contact with the energy storage devices 10 (to be more specific, the cases 12) disposed adjacently to the third body portion 231 from the outside in the Y-Z plane direction thus restricting the relative movement of the energy storage devices 10 in the Y-Z plane direction with respect to the third body portion 231. The third restricting portions 232 extend in the X axis direction from at least respective corner portions of the third body portion 231 thus are brought into contact with corner portions of the energy storage devices 10 (the case 12) disposed adjacently to the third body portion 231 from the outside in the Y-Z plane direction.

As shown in FIG. 1, the holder 3 collectively holds the plurality of energy storage devices 10 and the plurality of adjacent members 2 by surrounding the peripheries of the plurality of energy storage devices 10 and the plurality of adjacent members 2. The holder 3 is made of a material having conductivity. To be more specific, as also shown in FIG. 2, the holder 3 includes: a pair of end members 30 which is disposed such that the plurality of energy storage devices 10 are positioned between the end members 30 in the X axis direction; and opposedly facing members 31 which connect the pair of end members 30 to each other in a state where the opposedly facing members 31 opposedly face the plurality of energy storage devices 10 in the Y axis direction. In the energy storage apparatus 1 of this embodiment, the pair of end members 30 is disposed such that each of the pair of end members 30 sandwiches the second adjacent member 22 in cooperation with the energy storage device 10 disposed on an end of a unit formed of the plurality of energy storage devices 10 in the X axis direction, and the pair of opposedly facing members 31 is disposed on both sides in the Y axis direction of the unit formed of the plurality of energy storage devices 10 which are arranged in a row in the X axis direction.

The pair of end members 30 expands in the Y-Z plane direction respectively. To be more specific, each of the pair of end members 30 includes: a body 300 having a profile (a rectangular profile in this embodiment) which corresponds to the energy storage device 10; and a pressure contact portion 301 which projects toward the second body portion 221 of the second adjacent member 22 from the body 300 and is brought into contact with the second adjacent member 22.

Figure 5:
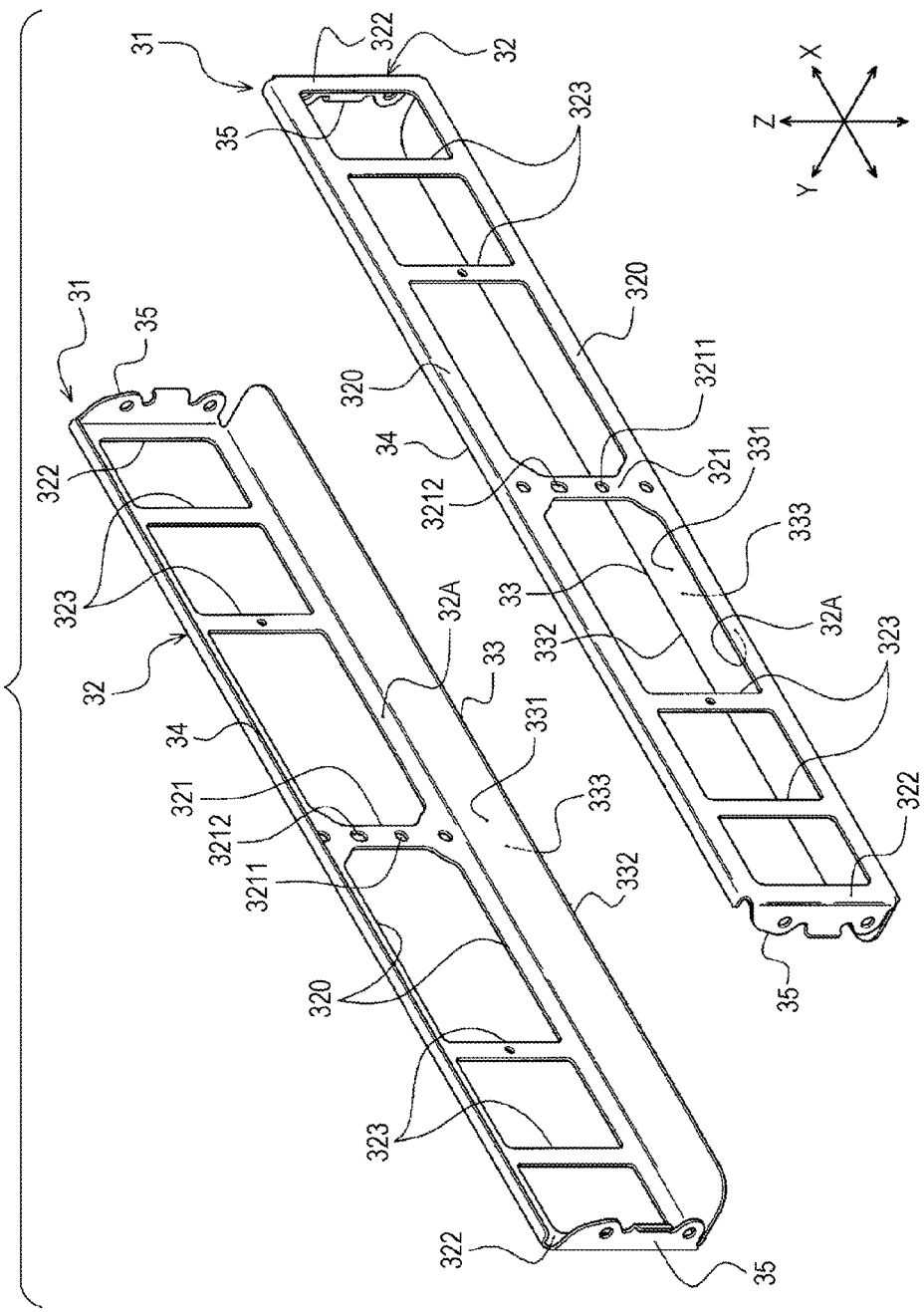
FIG. 5 is a perspective view of a pair of opposedly facing members used in the energy storage apparatus.

Each of the pair of opposedly facing members 31 opposedly faces the short wall portions 126 which forms one surfaces of the cases 12. As also shown in FIG. 5, the opposedly facing member 31 includes a body 32 which extends along the short wall portions 126, and a first extension portion 33 which extends from the body 32 along the closed portions 123 of the cases 12. In this embodiment, the opposedly facing member 31 also includes: a second extension portion 34 which extends from the body 32 along the lid plates 121 of the cases 12; and a pair of connection members 35 which connects the body 32 to the end members 30.

The body 32 is a plate-like portion extending along the X-Z plane (a plane including the X axis and the Z axis) direction. To be more specific, the body 32 includes: a pair of beam portions 320 which extends in the X axis direction and is disposed in a spaced-apart manner in the Z axis direction; a first connection portion 321 which connects the pair of beam portions 320 to each other at an intermediate position in the X axis direction (in an example of this embodiment, a position overlapping with the first adjacent member 21 in the Y axis direction); and a pair of second connection portions 322 which connects end portions of the pair of beam portions 320 to each other. In this embodiment, the body 32 also includes at least one third connection portion 323 which connects the pair of beam portions 320 to each other between the first connection portion 321 and the second connection portions 322.

The pair of beam portions 320 extends along end portions in the Z axis direction of the short wall portions 126 of the plurality of energy storage devices 10 (cases 12) arranged in a row in the X axis direction. The first connection portion 321 extends in the Z axis direction, and has through holes 3211, 3212 which penetrate the first connection portion 321 in the thickness direction at positions corresponding to the connecting portion 2111 and the shaft portion 213 of the first adjacent member 21 (to be more specific, positions overlapping with the connecting portion 2111 and the shaft portion 213 of the first adjacent member 21 in the Y axis direction). The bolt B is made to pass through the through hole 3211, and the bolt B is threadedly engaged with the connecting portion 2111 of the first adjacent member 21. With such a configuration, the opposedly facing member 31 (body 32) and the first adjacent member 21 are connected to each other. The shaft portion 213 of the first adjacent member 21 is made to pass through the through hole 3212. The second connection portion 322 extends in the Z axis direction at a position overlapping with the end member 30 in the Y axis direction. The third connection portions 323 extend in the Z axis direction at positions overlapping with the energy storage devices 10 in the Y axis direction.

The first extension portion 33 is a plate-like portion which extends from an end edge of the body 32 (an end edge of the beam portion 320) on a closed portion 123 side in the Y axis direction and in the X axis direction. That is, the first extension portion 33 is a plate-like portion extending along the respective closed portions 123 of the plurality of energy storage devices 10 which are arranged in a row in the X axis direction. A size of the first extension portion 33 in the X axis direction is substantially equal to a size of the beam portion 320 (body 32) in the X axis direction. In this embodiment, the first extension portion 33 has a rectangular shape elongated in the X axis direction as viewed in the Z axis direction. The first extension portion 33 and the beam portion 320 to which the first extension portion 33 is connected form an L-shape cross-sectional shape (cross-sectional shape in the Y-Z plane direction), that is, a cross-sectional shape where a center portion is bent thus constraining the corner portions of the respective energy storage devices 10 on a closed portion 123 side (corner portions formed by the closed portions 123 and the short wall portions 126 of the respective energy storage devices 10) from the outside in the Y-Z plane direction.

The second extension portion 34 is a plate-like portion which extends from an end edge of the body 32 (an end edge of the beam portion 320) on a lid plate 121 side in the Y axis direction and in the X axis direction. That is, the second extension portion 34 is a plate-like portion extending along the respective lid plates 121 of the plurality of energy storage devices 10 which are arranged in a row in the X axis direction. A size of the second extension portion 34 in the X axis direction is, in the same manner as the first extension portion 33, substantially equal to a size of the beam portion 320 (body 32) in the X axis direction. In this embodiment, the second extension portion 34 has a rectangular shape elongated in the X axis direction as viewed in the Z axis direction. A size of the second extension portion 34 in the Y axis direction is smaller than a size of the first extension portion 33 in the Y axis direction. The second extension portion 34 and the beam portion 320 to which the second extension portion 34 is connected form an L-shape cross-sectional shape (a cross-sectional shape in the Y-Z plane direction), that is, a cross-sectional shape where a center portion is bent thus constraining the corner portions of the respective energy storage devices 10 on a lid plate 121 side (corner portions formed by the lid plates 121 and the short wall portions 126 of the respective energy storage devices 10) from the outside in the Y-Z plane direction.

Each of the pair of connection members 35 is a plate-like portion which extends from an end edge (an end edge of the second connection portion 322) of the body 32 in the X axis direction to the Y axis direction and to the Z axis direction. A size of the connection member 35 in the Z axis direction is substantially equal to a size of the second connection portion 322 (body 32) in the Z axis direction. The connection members 35 are connected to the end members 30 so that the end members 30 and the opposedly facing member 31 are connected (joined) to each other. In the holder 3 in this embodiment, the connection members 35 and end portions of the end members 30 in the Y axis direction are connected (fastened) to each other using fastening members such as bolts.

Figure 6:
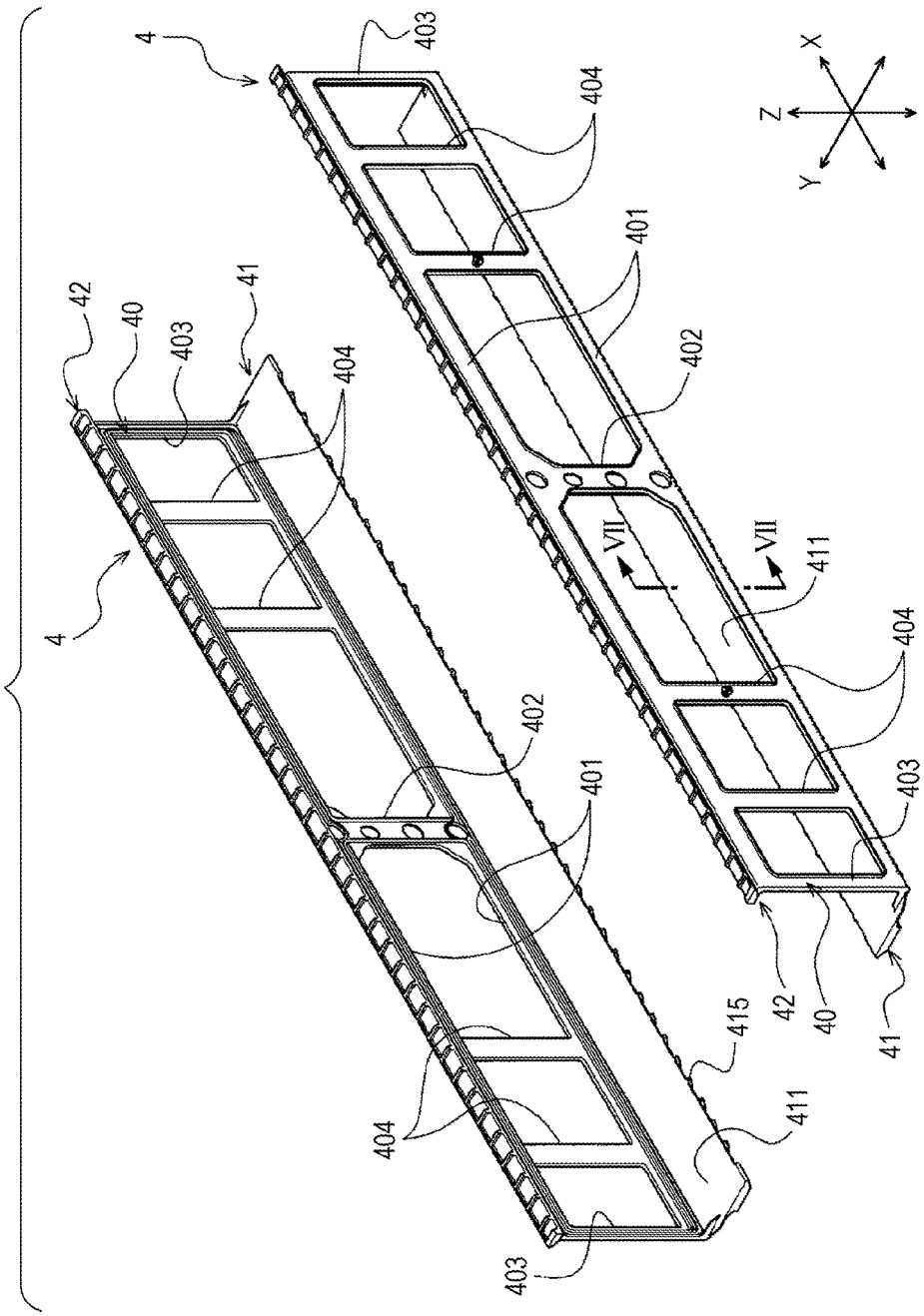
FIG. 6 is a perspective view of a pair of insulators used in the energy storage apparatus.

The insulators 4 are made of a material having an insulating property. As shown in FIG. 1 and FIG. 2, each insulator 4 is disposed between the opposedly facing member 31 and the plurality of energy storage devices 10 arranged in a row in the X axis direction. The insulators 4 cover at least regions of the holder 3 which opposedly face the plurality of energy storage devices 10. With such a configuration, the insulators 4 provide insulation between the holder 3 and the plurality of energy storage devices 10 arranged in a row in the X axis direction. To be more specific, as also shown in FIG. 6, the insulator 4 includes: a body cover portion 40 which covers the body 32, a first cover portion (cover portion) 41 which covers the first extension portion 33, and a second cover portion 42 which covers the second extension portion 34.

The body cover portion 40 covers an opposedly facing surface (hereinafter also referred to as a body opposedly facing surface) 32A of the body 32 which opposedly faces the energy storage devices 10 (to be more specific, the short wall portions 126) (see FIG. 5). The body cover portion 40 has a shape corresponding to a shape of the body 32. That is, the body cover portion 40 includes: a pair of first body cover portions 401 which covers opposedly facing surfaces of the beam portions 320 which opposedly face the energy storage devices 10; a second body cover portion 402 which covers an opposedly facing surface of the first connection portion 321 which opposedly faces the energy storage device 10; a pair of third body cover portions 403 which covers opposedly facing surfaces of the second connection portions 322 which opposedly face the end members 30 respectively; and at least one fourth body cover portion 404 which covers an opposedly facing surface of the corresponding third connection portion 323 which opposedly faces the energy storage device 10.

Figure 8:
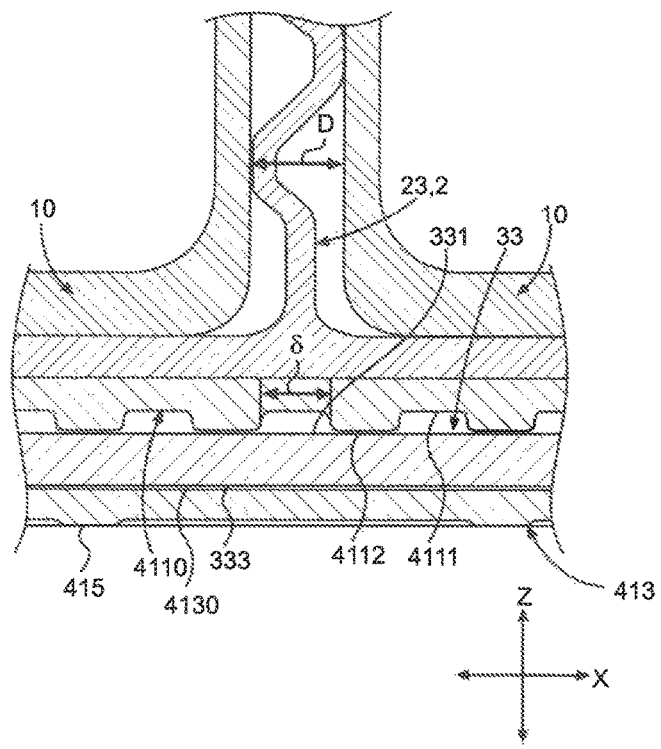
FIG. 8 is a cross-sectional view of the first extension portion of the opposedly facing member taken along a line VIII-VIII in FIG. 7 in a state where the first extension portion is covered by the first cover portion of the insulator.

As also shown in FIG. 7 and FIG. 8, the first cover portion 41 extends from a boundary position between the first extension portion 33 and the body 32 to a distal end (a distal end in the Y axis direction) 332 of the first extension portion 33 along the opposedly facing surface 331 of the first extension portion 33 which opposedly faces the energy storage devices 10 (closed portions 123), is folded back at the distal end 332, and extends along a surface 333 (hereinafter referred to as "outer surface") of the first extension portion 33 opposite to the energy storage devices 10. That is, the first cover portion 41 includes: a first portion 411 which covers the opposedly facing surface 331 of the first extension portion 33; a second portion 412 which covers the distal end 332 of the first extension portion 33; and a third portion 413 which covers the outer surface 333 of the first extension portion 33.

The first portion 411 is a plate-like portion of the first cover portion 41 which expands along the opposedly facing surface 331 of the first extension portion 33, and has an inner surface (hereinafter referred to "first inner surface") 4110 which opposedly faces the opposedly facing surface 331. The first inner surface 4110 includes a projecting portion 4112 which projects toward the opposedly facing surface 331 of the first extension portion 33. The specific configuration of the first portion 411 is described as follows.

The first portion 411 includes: a first portion body 4111 which is a rectangular plate-like portion having a profile corresponding to the first extension portion 33; and a plurality of projecting portions 4112 which project toward the opposedly facing surface 331 of the first extension portion 33 from the first portion body 4111. The first inner surface 4110 is formed of: a surface of the first portion body 4111 on an opposedly facing surface 331 side; and surfaces of the plurality of projecting portions 4112. That is, the first inner surface 4110 includes the surface of the first portion body 4111 on the opposedly facing surface 331 side and the surfaces of the plurality of projecting portions 4112.

The plurality of respective projecting portions 4112 extend in the direction directed toward the distal end 332 of the first extension portion 33 from a boundary position between the body 32 and the first extension portion 33 (that is, in the Y axis direction). The plurality of projecting portions 4112 are arranged at intervals in the X axis direction. To be more specific, the plurality of respective projecting portions 4112 extend straightly over the whole region of the surface of the first portion body 4111 in the Y axis direction which is directed toward the first extension portion 33 (the surface of the first portion body 4111 which opposedly faces the opposedly facing surface 331), and are arranged at equal intervals in the X axis direction. That is, the plurality of respective projecting portions 4112 extend to the position corresponding to the boundary position (the boundary position between the body 32 and the first extension portion 33) from the position corresponding to the distal end 332 of the extension portion 33. The plurality of projecting portions 4112 have the same height (projection amount) from the first portion body 4111 in the Z axis direction.

The second portion 412 is a portion of the first cover portion 41 which is folded back from a distal end (an end edge in the Y axis direction) of the first portion 411 so as to cover the distal end 332 of the first extension portion 33. The second portion 412 has an inner surface (hereinafter referred to as "second inner surface") 4120 which opposedly faces the distal end 332 of the first extension portion 33. A distance is provided between the second inner surface 4120 and the distal end 332 of the first extension portion 33 (see FIG. 7).

In this embodiment, the second inner surface 4120 includes a surface which approaches the distal end 332 of the extension portion 33 as the surface advances in a direction toward the outer surface 333 from the opposedly facing surface 331 of the extension portion 33. This surface is an inclined surface directed downward as the inclined surface approaches the distal end 332 of the extension portion 33 when the energy storage apparatus 1 is disposed such that the opposedly facing surface 331 of the extension portion 33 is directed upward.

The third portion 413 is a plate-like portion of the first cover portion 41 which expands along the outer surface 333 of the first extension portion 33, and has an inner surface (hereinafter referred to "third inner surface") 4130 which opposedly faces the outer surface 333. A distance which corresponds to a thickness of the first extension portion 33 in the Z axis direction is provided between the third portion 413 and the first portion 411. In this embodiment, the third portion 413 is a rectangular plate-like portion. A size of the third portion 413 in the Y axis direction is smaller than a size of the first extension portion 33 in the Y axis direction. That is, a size of the third inner surface 4130 in the Y axis direction is smaller than a size of the first extension portion 33 in the Y axis direction.

Figure 9:
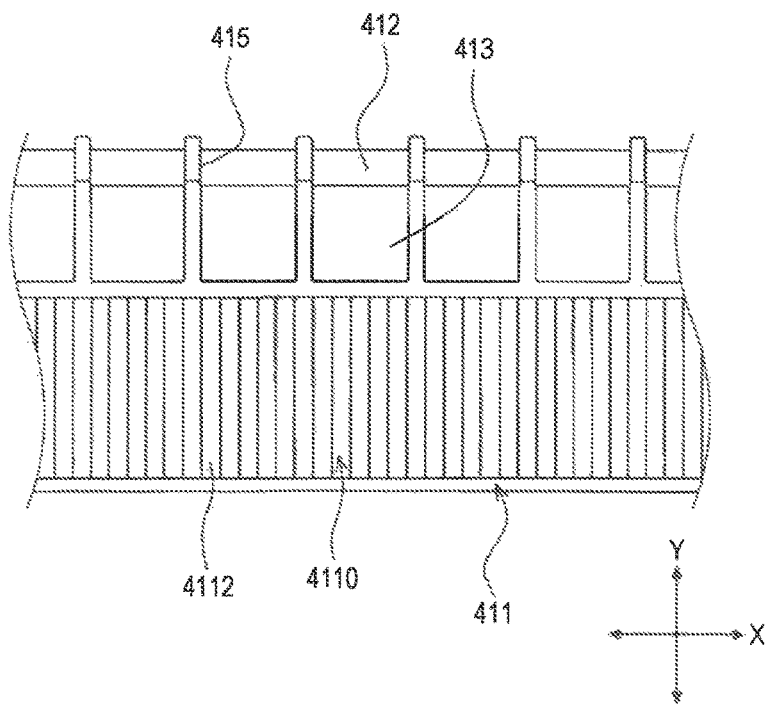
FIG. 9 is a bottom surface view of the insulator.

As also shown in FIG. 9, the second portion 412 and the third portion 413 having the above-mentioned configuration respectively include a plurality of projecting portions 415 which extend in the Y axis direction and are disposed parallel to each other at intervals in the X axis direction on outer surfaces thereof (surfaces directed toward opposite to the energy storage device 10). The plurality of respective projecting portions 415 continuously extend across substantially the whole of the second portion 412 and the third portion 413 in the Y axis direction.

In the first cover portion 41, a gap (distance) between the first portion 411 and the third portion 413 is closed (shut) on both ends in the X axis direction. With such a configuration, the distal end portion (the distal end portion in the Y axis direction) of the first cover portion 41 is formed into a bag shape which allows the insertion of the distal end portion of the first extension portion 33 into the distal end portion of the first cover portion 41.

The second cover portion 42 covers at least a region of the second extension portion 34 which opposedly faces the energy storage devices 10. In this embodiment, the second cover portion 42 covers the surface of the second extension portion 34 which opposedly faces the energy storage devices 10, and the surface of the second extension portion 34 opposite to the energy storage devices 10.

Returning to FIG. 1 and FIG. 2, each of the bus bars 5 is formed of a plate-like member which is made of a material having conductivity such as metal. The bus bars 5 connect all of the plurality of energy storage devices 10 included in the energy storage apparatus 1 to each other in series (in a conductive manner). The bus bars 5 include plural kinds of bus bars. In this embodiment, the bus bars 5 include: a first bus bar 51 which makes the external terminals 13 of the energy storage devices 10 which are disposed adjacently to each other with the first adjacent member 21 interposed therebetween conductive with each other (that is, connects the external terminals 13 to each other in a state where the first bus bar 51 straddles over the first adjacent member 21); and second bus bars 52 each of which makes the external terminals 13 of the energy storage devices 10 which are disposed adjacently to each other with the third adjacent member 23 interposed therebetween conductive with each other (that is, connects the external terminals 13 to each other in a state where the second bus bar 52 straddles over the third adjacent member 23). In this embodiment, the energy storage apparatus 1 includes one first bus bar 51 and the plurality of second bus bars 52.

The first bus bar 51 includes, between one external terminal 13 and the other external terminal 13 which are electrically connected to each other, a portion which extends in a projecting manner in a direction (in an upward direction in FIG. 1) away from the first adjacent member 21 in the Z axis direction in a state where the portion is spaced-apart from the first adjacent member 21. The portion of the first bus bar 51 extending in a projecting shape has a shape which conforms to the projecting portion 2112 of the first adjacent member 21. In this embodiment, the first bus bar 51 is formed by applying bending or the like to a rectangular plate-like member.

The second bus bar 52 has an approximately rectangular plate shape extending in the X axis direction (to be more specific, expanding in the X-Y plane direction).

According to the energy storage apparatus 1 having the above-mentioned configuration, water which is adhered to or generated on the opposedly facing surface (body opposedly facing surface 32A) of the body 32 which opposedly faces the energy storage device 10 or the like is easily sucked into a space (see FIG. 7 and FIG. 8) formed between the first inner surface 4110 and the first extension portion 33 due to a surface tension or the like as the projecting portions 4112 are brought into contact with the first extension portion 33. Further, the first cover portion 41 is folded back at the distal end 332 of the first extension portion 33 and hence, even when water which is sucked into the space formed between the first inner surface 4110 and the first extension portion 33 leaks out, water leaks out to an outer surface 333 of the first extension portion 33 and there is a least possibility that water advances toward an energy storage device 10. As a result, in the energy storage apparatus 1, there is a least possibility that electric resistance between the energy storage devices 10 and the opposedly facing member 31 becomes small due to water adhered to or generated on the body opposedly facing surface 32A of the body 32 of the opposedly facing member 31. That is, there is a least possibility that short-circuiting caused by water adhered to or generated on the body opposedly facing surface 32A of the body 32 of the opposedly facing member 31 (for example, short-circuiting between the energy storage devices 10, short-circuiting between the energy storage device 10 and the holder 3) or the like occurs.

In the energy storage apparatus 1 of this embodiment, the projecting portions 4112 extend in the Y axis direction. Accordingly, in the Y axis direction, a space formed between the first inner surface 4110 and the first extension portion 33 becomes large by the projecting portions 4112 and hence, an amount of water which can be stored between the first inner surface 4110 and the first extension portion 33 can be increased. Accordingly, an amount of water adhered to or generated on the body opposedly facing surface 32A of the body 32 which can be sucked into the space is increased, and there is a least possibility that water leaks out from between the first inner surface 4110 and the first extension portion 33. As a result, it is possible to prevent with further certainty that electric resistance between the energy storage devices 10 and the opposedly facing member 31 becomes small due to water adhered to or generated on the body opposedly facing surface 32A of the body 32 of the opposedly facing member 31.

In the energy storage apparatus 1 of this embodiment, the first inner surface 4110 includes the plurality of projecting portions 4112 arranged at intervals in the X axis direction (to be more specific, the surfaces of the projecting portions 4112). Accordingly, spreading or movement of water sucked into the space formed between the first inner surface 4110 and the extension portion 33 (opposedly facing surface 331) in the X axis direction can be suppressed. To be more specific, the space formed between the first inner surface 4110 and the extension portion 33 is divided into a plurality of regions by the plurality of projecting portions 4112 (in other words, the space formed between the first inner surface 4110 and the first extension portion 33 is brought into a state where the space is partitioned (divided) in the X axis direction by the projecting portions 4112 (see FIG. 8)) and hence, water sucked into a certain region (a certain space between the projecting portions 4112) of the space is minimally movable to other regions (other spaces between the projecting portions 4112). Accordingly, when the installed energy storage apparatus 1 is inclined or the like so that one end portion of the energy storage apparatus 1 in the X axis direction becomes lower than the other end portion of the energy storage apparatus 1 in the X axis direction, it is possible to prevent water stored between the first inner surface 4110 and the first extension portion 33 from being collected to one end portion (one place). With such a configuration, it is possible to effectively prevent a phenomenon that water is collected in this manner and the collected water leaks out from between the first inner surface 4110 and the first extension portion 33.

In the energy storage apparatus 1, as shown in FIG. 8, it is preferable that a distance δ between the projecting portions 4112 which are disposed adjacently to each other in the X axis direction be smaller than a distance D between the energy storage devices 10 disposed adjacently to each other in the X axis direction. This is because a size of each divided space between the first inner surface 4110 and the extension portion 33 becomes smaller than the distance between the energy storage devices 10 so that it is possible to suppress expanding of water which is sucked into the space exceeding the distance D between the energy storage devices 10 in the X axis direction. The distance D between the energy storage devices 10 disposed adjacently to each other in the X axis direction means a distance between the long wall portions 125 of the energy storage devices 10 which opposedly face each other in a spaced-apart manner in the X axis direction, and the distance δ between the projecting portions 4112 disposed adjacently to each other in the X axis direction means a distance between side surfaces of the projecting portions 4112 which opposedly face each other in a spaced-apart manner in the X axis direction.

Further, in the energy storage apparatus 1 of this embodiment, a distance is provided between the second inner surface 4120 of the first cover portion 41 which covers the distal end 332 of the first extension portion 33 and the distal end 332 (see FIG. 7). With such a configuration, water sucked into the space between the first inner surface 4110 and the first extension portion 33 can be stored in the space between the second inner surface 4120 and the distal end 332 of the first extension portion 33 which is disposed at a position remote from the body 32. Accordingly, it is possible to prevent with further certainty that water sucked into the space between the first inner surface 4110 and the first extension portion 33 leaks out from the body 32 side.

The second inner surface 4120 includes a surface which approaches the distal end 332 of the extension portion 33 as the second inner surface 4120 advances in a direction toward the outer surface 333 from the opposedly facing surface 331 of the extension portion 33. With such a configuration, when the energy storage apparatus 1 is disposed such that the opposedly facing surface 331 of the extension portion 33 is directed upward, the surface which the second inner surface 4120 includes (a surface which approaches the distal end 332 of the extension portion 33 as the surface advances in a direction toward the outer surface 333 from the opposedly facing surface 331 of the extension portion 33) becomes an inclined surface directed downward as the inclined surface approaches the distal end 332 of the extension portion 33. With such a configuration, water stored between the second inner surface 4120 and the distal end 332 of the extension portion 33 is easily moved toward the outer surface 333 of the extension portion 33. That is, the stored water minimally moves toward the opposedly facing surface 331 of the extension portion 33. As a result, it is possible to effectively suppress the leakage of the stored water from the body 32 of the opposedly facing member 31 through the space formed between the first inner surface 4110 and the extension portion 33.

In the energy storage apparatus 1 of this embodiment, the third inner surface 4130 of the first cover portion 41 which opposedly faces the outer surface 333 of the first extension portion 33 has a size smaller than a size of the first extension portion 33 in the Y axis direction. As described above, in the energy storage apparatus 1, the third inner surface 4130 is shorter than the first extension portion 33 in the Y axis direction and hence, water sucked into the space between the first inner surface 4110 and the first extension portion 33 is easily discharged from the outer surface 333 (a side remote from the energy storage device 10) of the first extension portion 33 as compared to from the opposedly facing surface 331 (a side close to the energy storage device 10) of the first extension portion 33 which is wholly covered by the first cover portion 41. Accordingly, water sucked into the space formed between the first inner surface 4110 and the first extension portion 33 is discharged from a side remote from the energy storage device 10 and hence, it is possible to suppress the leakage of water from a side close to the energy storage device 10 with further certainty. As a result, in the energy storage apparatus 1, short-circuiting caused by water adhered to or generated on the body opposedly facing surface 32A of the body 32 of the opposedly facing member 31 or the like further minimally occurs.

It is needless to say that the energy storage device of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

A specific shape of the projecting portion 4112 included in the first inner surface 4110 is not limited. For example, the projecting portions 4112 in the above-mentioned embodiment extend continuously and straightly from the boundary position between the first extension portion 33 and the body 32 to the distal end 332 of the first extension portion 33 in the Y axis direction. However, the present invention is not limited to such a configuration, the projecting portions 4112 may be curved, bent or the like, and may not be formed in a continuously extending manner (that is, may be configured to extend intermittently in the Y axis direction). Further, a size of the projecting portion 4112 in the X axis direction may be larger than a size of the projecting portion 4112 in the Y axis direction.

The third portion 413 of the first cover portion 41 extends from a position of the distal end 332 of the first extension portion 33 to an intermediate position of the first extension portion 33 in the Y axis direction. However, the present invention is not limited to such a configuration. For example, the third portion 413 may extend to the boundary position between the first extension portion 33 and the body 32 in the Y axis direction. Further, the first cover portion 41 may not include the third portion 413.

What is claimed is:

1. An energy storage apparatus, comprising:
an energy storage device containing a case where a corner portion is formed by a first wall portion and a second wall portion;
an opposedly facing member which opposedly faces the first wall portion; and
an insulator covering at least a region of the opposedly facing member which opposedly faces the energy storage device,
wherein the opposedly facing member contains a body disposed along the first wall portion and an extension portion extending from the body along the second wall portion,
wherein the insulator contains a cover portion which extends to a distal end of the extension portion from a boundary position between the extension portion and the body along an opposedly facing surface of the extension portion which opposedly faces the second wall portion, is folded back at the distal end, and extends along an outer surface of the extension portion opposite to the second wall portion,
wherein a first inner surface of the cover portion, which opposedly faces the opposedly facing surface of the extension portion, includes a projecting portion which projects toward the opposedly facing surface,
wherein the projecting portion extends in a direction toward the distal end from the boundary position,
wherein the energy storage apparatus includes a plurality of energy storage devices,
wherein the energy storage devices are disposed in a state where the first wall portions and the second wall portions are directed in same directions respectively, and
wherein the first inner surface includes the plurality of projecting portions arranged at intervals in a direction that the plurality of energy storage devices are arranged in a row.

2. The energy storage apparatus according to claim 1, wherein the projecting portion extends to a position corresponding to the boundary position of the extension portion from a position corresponding to the distal end of the extension portion.

3. The energy storage apparatus according to claim 1, wherein a distance is provided between a second inner surface of the cover portion, which covers the distal end of the extension portion, and the distal end.

4. The energy storage apparatus according to claim 3, wherein the second inner surface includes a surface which approaches the distal end of the extension portion as the second inner surface advances in a direction toward the outer surface from the oppositely facing surface of the extension portion.

5. The energy storage apparatus according to claim 1, wherein a third inner surface of the cover portion, which oppositely faces the outer surface of the extension portion, has a size smaller than a size of the extension portion in the direction toward the distal end from the boundary position.

6. The energy storage apparatus according to claim 1, wherein a distance between the projecting portions disposed adjacently to each other in the direction that the plurality of energy storage devices are arranged in the row is smaller than a distance between the energy storage devices disposed adjacently to each other in the direction that the plurality of energy storage devices are arranged in the row.

7. The energy storage apparatus according to claim 1, wherein a second inner surface of the cover portion, which covers the distal end of the extension portion, includes a surface which approaches, with an inclined angle with respect to the extension portion, toward the distal end of the extension portion.

8. The energy storage apparatus according to claim 1, wherein a second inner surface of the cover portion, which covers the distal end of the extension portion, includes a surface which approaches, with an inclined angle with respect to the extension portion, toward the distal end of the extension portion as the second inner surface advances in a direction toward the outer surface from the oppositely facing surface of the extension portion.

9. The energy storage apparatus according to claim 1, wherein a second inner surface of the cover portion, which covers the distal end of the extension portion, includes an inclined surface directed downward as the inclined surface approaches the distal end of the extension portion, the energy storage apparatus being disposed such that the oppositely facing surface of the extension portion is directed upward.

10. The energy storage apparatus according to claim 1, wherein a second inner surface of the cover portion, which covers the distal end of the extension portion, is inclined with respect to the extension portion.

11. The energy storage apparatus according to claim 1, wherein the case includes a third wall which is opposed to the second wall and on which an external terminal is disposed.

12. An energy storage apparatus, comprising:
an energy storage device containing a case where a corner portion is formed by a first wall portion and a second wall portion;
an oppositely facing member which oppositely faces the first wall portion; and
an insulator covering at least a region of the oppositely facing member which oppositely faces the energy storage device,
wherein the oppositely facing member contains a body disposed along the first wall portion and an extension portion extending from the body along the second wall portion,
wherein the insulator contains a cover portion which extends to a distal end of the extension portion from a boundary position between the extension portion and the body along an oppositely facing surface of the extension portion which oppositely faces the second wall portion, is folded back at the distal end, and extends along an outer surface of the extension portion opposite to the second wall portion,
wherein a first inner surface of the cover portion, which oppositely faces the oppositely facing surface of the extension portion, includes a projecting portion which projects toward the oppositely facing surface,
wherein a distance is provided between a second inner surface of the cover portion, which covers the distal end of the extension portion, and the distal end, and
wherein the second inner surface includes a surface which approaches, with an inclined angle with respect to the extension portion, toward the distal end of the extension portion as the second inner surface advances in a direction toward the outer surface from the oppositely facing surface of the extension portion.

13. The energy storage apparatus according to claim 12, wherein the case includes a third wall which is opposed to the second wall and on which an external terminal is disposed.

14. The energy storage apparatus according to claim 12, wherein the second inner surface extends downward as the second inner surface approaches the distal end of the extension portion, the energy storage apparatus being disposed such that the oppositely facing surface of the extension portion is directed upward.

15. An energy storage apparatus, comprising:
an energy storage device containing a case where a corner portion is formed by a first wall portion and a second wall portion, the case including a third wall which is opposed to the second wall and on which an external terminal is disposed;
an oppositely facing member which oppositely faces the first wall portion; and
an insulator covering at least a region of the oppositely facing member which oppositely faces the energy storage device,
wherein the oppositely facing member contains a body disposed along the first wall portion and an extension portion extending from the body along the second wall portion,
wherein the insulator contains a cover portion which extends to a distal end of the extension portion from a boundary position between the extension portion and the body along an oppositely facing surface of the extension portion which oppositely faces the second wall portion, is folded back at the distal end, and extends along an outer surface of the extension portion opposite to the second wall portion, and
wherein a first inner surface of the cover portion, which oppositely faces the oppositely facing surface of the extension portion, includes a projecting portion which projects toward the oppositely facing surface.

16. The energy storage apparatus according to claim 15, wherein a distance is provided between a second inner surface of the cover portion, which covers the distal end of the extension portion, and the distal end.

17. The energy storage apparatus according to claim 16, wherein the second inner surface of the cover portion includes a surface which approaches, with an inclined angle with respect to the extension portion, toward the distal end of the extension portion as the second inner surface advances in a direction toward the outer surface from the oppositely facing surface of the extension portion.

18. The energy storage apparatus according to claim 16, wherein the second inner surface of the cover portion includes an inclined surface directed downward as the inclined surface approaches the distal end of the extension portion, the energy storage apparatus being disposed such that the opposedly facing surface of the extension portion is directed upward.

\* \* \* \* \*